US005702635A

United States Patent [19]

Trani et al.

[11] Patent Number: 5,702,635

[45] Date of Patent: Dec. 30, 1997

[54] GRANULAR LAUNDRY BLEACHING COMPOSITION

[75] Inventors: Marina Trani; Carlo Ricci, both of Rome, Italy

[73] Assignee: The Procter & Gamble Company, Cincinnati, Ohio

[21] Appl. No.: 605,123

[22] PCT Filed: Sep. 13, 1994

[86] PCT No.: PCT/US94/10135

§ 371 Date: Mar. 5, 1996

§ 102(e) Date: Mar. 5, 1996

[87] PCT Pub. No.: WO95/08509

PCT Pub. Date: Mar. 30, 1995

[30] Foreign Application Priority Data

Sep. 21, 1993 [EP] European Pat. Off. .............. 93202722

[51] Int. Cl.[6] .......................... C01B 15/043; C01B 15/10; C01B 31/24; C11D 3/39

[52] U.S. Cl. ................................ 252/186.27; 252/186.43; 252/186.38; 510/309; 510/310; 423/415.2

[58] Field of Search ......................... 252/186.27, 186.38, 252/186.43; 510/309, 310, 312; 423/415.2

[56] References Cited

U.S. PATENT DOCUMENTS

| | | | |
|---|---|---|---|
| 3,025,271 | 3/1962 | Borchert et al. | 526/322 |
| 3,901,819 | 8/1975 | Nakagawa et al. | 8/111 |
| 3,936,303 | 2/1976 | Shiba et al. | 96/74 |
| 3,979,318 | 9/1976 | Tokiwa et al. | 252/186.1 |
| 4,892,967 | 1/1990 | Hull et al. | 524/309 |
| 4,931,583 | 6/1990 | Hull et al. | 524/309 |
| 5,244,644 | 9/1993 | Doetsch | 423/275 |
| 5,258,133 | 11/1993 | Chapple | 252/186.27 |
| 5,346,680 | 9/1994 | Roesler et al. | 423/274 |
| 5,409,632 | 4/1995 | Showell et al. | 252/186.23 |
| 5,496,728 | 3/1996 | Hardy et al. | 435/255.1 |

FOREIGN PATENT DOCUMENTS 9312067 6/1993 WIPO .

*Primary Examiner*—Joseph D. Anthony
*Attorney, Agent, or Firm*—Robert B. Aylor; T. David Reed

[57] ABSTRACT

A particulate bleaching composition is disclosed which comprises particles of an alkali metal salt of percarbonate or mixtures thereof. The particles of the percarbonate bleach are coated and/or agglomerated with a stabilizing effective amount of a hydrophobic ester of citric acid or mixtures of the hydrophobic esters of citric acid.

19 Claims, No Drawings

GRANULAR LAUNDRY BLEACHING COMPOSITION

CROSS REFERENCE TO RELATED APPLICATION

This application is a 371 of PCT/US94/10135 filed on Sep. 13, 1994.

1. Technical Field

The present invention relates to particulate bleaching compositions for laundry. Particulate laundry bleaching compositions are described which comprise percarbonate as the bleaching specie, said compositions being stable upon manufacture and storage.

2. Background of the Invention

The inorganic perhydrate bleach most widely used in the context of laundry bleaching is sodium perborate in the form of either the monohydrate or tetrahydrate. However, concerns about the impact of boron salts on the environment have led to an increasing interest in other perhydrate salts, of which sodium percarbonate is the most readily available.

Detergent compositions containing sodium percarbonate are known in the art, for instance in FR 2,385,837, U.S. Pat. No. 4,428,914 and GB 1,553,505. Percarbonate salts, particularly sodium percarbonate, are attractive perhydrates for use in detergent compositions because they dissolve readily in water, are weight efficient and, after giving up their available oxygen, provide a useful source of carbonate ions for detergency purposes.

However, the inclusion of percarbonate salts in detergent compositions has been restricted hitherto by the relative instability of the bleach both as is and in use. Sodium percarbonate loses its available oxygen at a significant rate in the presence of ions or heavy metals such as iron, copper and manganese and also in the presence of moisture, these effects being accelerated at temperatures in excess of about 30° C.

Moisture and heavy metal ions are unavoidable components of conventional granular laundry treatment compositions. Also percarbonate decomposition due to moisture becomes more of an issue during storage as laundry treatment products are often stored in humid environments when the product picks up moisture. This has resulted in marginally acceptable percarbonate bleach stability under Northern European summer conditions, where the average maximum temperature over the hottest months is from 21° C. to 25° C., and unacceptable stability under temperatures higher than this. Such conditions are found in the Middle East and Southern Asia and also in Southern Europe where average maximum temperatures are in the 27° C. to 33° C. range for the hottest summer month.

Such temperature accelerated percarbonate decomposition also occurs during the manufacture of the finished product. Indeed, as individual ingredients are mixed together the temperature of the mixture increases, accelerating the decomposition of the percarbonate. Furthermore, the temperature increase is greater if the mixing occurs under adiabatic or semi-adiabatic conditions.

Additionally when said percarbonate having a poor thermal stability is used in granular compositions together with common bleach activators (TAED, NOBS, . . . ) the stability becomes even more of a problem. Indeed, said percarbonate and said activators which are capable to react as fast as possible in water during the bleaching operation also tend to violently react in said granular compositions upon the manufacture or the storage, especially if said compositions are subjected to humid environments. In other words, said compositions may lose some activity.

It is therefore an object of the present invention to provide a particulate laundry bleaching composition incorporating an alkali metal percarbonate bleach, said bleach displaying improved stability both upon the manufacture and the storage of said particulate laundry bleaching composition.

It is a further object of the present invention to provide a stable particulate laundry bleaching composition comprising a percarbonate source of hydrogen peroxide together with a bleach activator.

It has now been found that these objects could be met by formulating a particulate bleaching composition comprising particles of percarbonate wherein said particles further comprise a hydrophobic ester of citric acid or mixtures thereof. In other words, the stability of said particulate bleaching composition can be improved to a satisfactory degree due to the presence of said particles of percarbonate which further comprise a useful and environmentally friendly material. Accordingly, said particles of the present invention may be obtained by different methods known in the art, such as for instance, spraying or agglomerating or coating methods. Indeed, said hydrophobic ester of citric acid may be used either as an agglomerating or a coating agent to agglomerate or coat the particles of percarbonate.

It is particularly surprising that when the particles of percarbonate of the present invention further comprise a hydrophobic ester of citric acid such as acylated citrate esters, and in particular acetyl triethyl citrate and its homologues, the compositions comprising them exhibit excellent stability properties. Indeed, we have found that said acylated citrate esters are efficient bleach activators and it would be expected that said bleach activators would rather react with percarbonate and thereby destabilize the compositions.

The stabilization effect of some of the hydrophobic esters of citric acid such as the acylated citrate esters when used according to the present invention are unexpected and beneficial as said acylated citrate esters are only known in the context of laundry compositions as builders and bleach activators for instance in WO-93-12067.

More particularly, it has also been found that absorbing a hydrophobic ester of citric acid or mixtures thereof over a finished product including uncoated particles of sodium percarbonate and other particulate ingredients, results in an outstanding stability of the finished product.

Additionally, due to the outstanding stability of the compositions of the present invention, manufacturing, shipment and handling conditions are eased.

It is a further advantage to use the hydrophobic esters of citric acid according to the present invention as they exhibit interesting building capacity. Such benefit is particularly useful in the context of a laundering application.

Another advantage of the present invention is that the stabilization effect provided by the hydrophobic esters of citric acid onto particles of percarbonate is additional to the stabilization effect provided by stabilizing agents, well known in the art, such as SKS$^R$-6 and/or Sokalan$^R$. In other words, a higher stability can be achieved with the compositions of the present invention. Copending European Patent Application n° 92201568.0 and European Patent EP-A-550 077 disclose the use of said particular stabilizing agents such as respectively, dry-form compositions of polymers (i.e. SOKALAN$^R$ or NORASOL$^R$) and crystalline layered silicates (i.e. Na SKS-6R).

It is also an advantage of the present invention that it provides compositions wherein a particle includes at the same time a bleach source (percarbonate) and a bleach activator (e.g. an acylated triethyl citrate). Thus, if any segregation occurs in the compositions, for example, during transport or storage, the right ratio between the bleach and the bleach activator is always ensured. Also, in the wash, the maximum perhydrolisis rate of the acylated triethyl citrate will be ensured given the close contact with the bleach source.

SUMMARY OF THE INVENTION

Compositions according to the present invention are particulate bleaching compositions comprising particles of an alkali metal salt of percarbonate or mixtures thereof wherein said particles further comprise a hydrophobic ester of citric acid or mixtures thereof. Thus, the present invention encompasses both a percarbonate "raw material", i.e. particles of percarbonate further comprising said hydrophobic ester of citric acid or mixtures thereof, as well as fully formulated compositions additionally comprising other, non-percarbonate, ingredients.

The present invention also encompasses particulate bleaching compositions comprising particles of percarbonate and other particulate ingredients usually used in the laundry field wherein both said particles of percarbonate and said particulate ingredients comprise a hydrophobic ester of citric acid or mixtures thereof.

The present invention also encompasses a method of manufacturing said particulate bleaching compositions, preferably by spray drying said hydrophobic ester of citric acid on finished compositions.

DETAILED DESCRIPTION OF THE INVENTION

The compositions according to the present invention are stable particulate bleaching compositions comprising particles of an alkali metal salt of percarbonate or mixtures thereof, said particles further comprising a hydrophobic ester of citric acid or mixtures thereof.

By stable it is meant herein that the compositions of the present invention undergo limited runaway reactions, i.e. with self-heating rates of a maximum of 3° C./h at 70° C. in adiabatic conditions. The self-heating rates may be measured using the method described herein after in the examples.

As an essential component, the compositions according to the present invention comprise an alkali metal salt of percarbonate or mixtures thereof. Preferred alkali metal salt of percarbonate to be used herein is sodium percarbonate. Sodium percarbonate is available commercially as a crystalline solid. Most commercially available materials include low levels of heavy metal sequestrants such as EDTA, 1-hydroxyethylidene 1,1-diphosphonic acid (HEDP) or an amino-phosphonate, which are incorporated during manufacturing.

The compositions according to the present invention comprise from 10% to 100% by weight of the total composition of said particles of percarbonate or mixtures thereof, preferably from 10% to 80%, most preferably from 20% to 60%.

According to the present invention, said particles of percarbonate further comprise a hydrophobic ester of citric acid.

Particularly suitable hydrophobic esters of citric acid are the acylated citrate esters of the formula

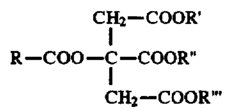

The R group is selected from a $C_{1-9}$ alkyl or alkenyl group, a substituted or unsubstituted phenyl, alkylphenyl, or alkenylphenyl group. Preferred substituted phenyls are sulpho phenyls. Preferably, R is methyl or heptyl, most preferably methyl. The R', R" and R'" are selected from H, $C_{1-18}$ alkyl or alkenyl group, a substituted or unsubstituted phenyl, alkylphenyl or alkenyl phenyl group. It is important for the stability of the particulate bleaching compositions of the present invention that R', R" and R'" of said acetyl citrate esters should not all be H in a given molecule. Preferably, R', R" and R'" are selected from H or a $C_{1-4}$ alkyl or alkenyl group. Most preferably, R', R" and R'" are ethyl.

It is also possible to use acylated citrate which are only partially esterified, i.e. R', R" or R'" or combinations thereof are H, the only proviso being that not all three of R', R" and R'" can be H in a given molecule. In the case where only one of R', R" and R'" is H, i.e. the acylated citrate ester is a diester, it is preferred to have a "central" diester, i.e. it is preferred that R" is not H. In the case where two of R', R" and R'" are H, i.e. the acylated citrate ester is a monoester, it is preferred to have a symmetrical monoester i.e. a central monoester, i.e it is preferred that R" is not H. In case where monoesters are used, it is preferred that the ester chain be rather long, i.e up to 18 carbon atoms. The citrate ester thus also acts as a precipitating builder.

Mixtures of hydrophobic esters of citric acid can also be used according to the present invention.

The preferred hydrophobic esters of citric acid to be used according to the present invention are tributyl citrate, triphenyl citrate, acetyl tributyl citrate, acetyl trimethyl citrate and acylated triethyl citrate.

The most preferred hydrophobic esters of citric acid to be used according to the present invention are acylated triethyl citrate such as hexanoyl triethyl citrate, octanoyl triethyl citrate, nonanoyl triethyl citrate and acetyl triethyl citrate. For example, acetyl triethyl citrate is commercially available from Morflex under the trade mark Citroflex$^R$ A-2.

The compositions according to the present invention comprise from 0.5% to 20% by weight of the total composition of said hydrophobic ester of citric acid or mixtures thereof, preferably from 1% to 10%, most preferably from 3% to 8%.

The particulate bleaching compositions according to the present invention may further comprise optional particulate ingredients. Highly preferred particulate ingredients are peroxy carboxylic acids bleach or precursors thereof, commonly referred to as bleach activators, which are preferably added in a prilled or agglomerated form. Examples of suitable compounds of this type are disclosed in British Patent GB 1 586 769 and GB 2 143 231 and a method for their formation into a prilled form is described in European Published Patent Application EP-A-62 523. Preferred examples of such compounds are tetracetyl ethylene diamine (TAED), sodium 3, 5, 5 trimethyl hexanoyloxybenzene sulphonate, diperoxy dodecanoic acid as described for instance in U.S. Pat. No. 4,818,425 and nonylamide of peroxyadipic acid as described for instance in U.S. Pat. No. 4,259,201 and n-nonanoyloxybenzenesulphonate (NOBS), and acetyl triethyl citrate (ATC) such as described in WO-93-12067.

The particulate bleaching compositions of the present invention may further comprise as an optional but highly preferred particulate ingredient an anhydrous acidifying agent or mixtures thereof. The purpose of said acidifying agent is to control the alkalinity generated by the percarbonate in the bleaching liquor. Said agent needs to be incorporated in the product in an anhydrous form, and to have a good stability in oxidizing environment. Suitable anhydrous acidifying agents for use herein are carboxylic acids such as citric acid, succinic acid, adipic acid, glutaric acid, 3 chetoglutaric acid, citramalic acid, tartaric acid and maleic acid. Other suitable acidifying agents include sodium bicarbonate, sodium sesquicarbonate and silicic acid. Highly preferred for use herein is citric acid. Indeed, citric acid is commercially available in anhydrous form, it additionally acts as a builder and a chelant, and it is biodegradable. The compositions according to the present invention comprise up to 15% by weight of the total composition of anhydrous citric acid, preferably from 2% to 9%, most preferably about 5%.

The particulate bleaching compositions according to the present invention may also comprise inorganic filler salts such as alkali metal carbonates, bicarbonates and sulphates. Such fillers for instance sodium bicarbonate, may also act as acidifying agent as described herein above.

Accordingly, sodium bicarbonate is a preferred filler material for use herein.

The particulate bleaching compositions according to the present invention may comprise conventional builders or soils suspenders also known for their stabilizing properties such as dry-form compositions known in the art under the trade mark SOKALAN$^R$ or crystalline layered silicate known in the art, for example, under the trade mark Na-SKS$^R$-6.

Depending on the use for which the compositions are intended, said compositions may comprise other optional ingredients such as optical brighteners, anti dusting agents such as olefines and waxes, enzymes, buffering agents, chelants, dispersants, surfactants, soil release agents, soil suspenders, photoactivated bleaches such as Zn phthalocyanine sulphonate, dyes, dye transfer inhibitors, pigments and perfumes are examples of such optional ingredients and can be added in varying amounts as desired.

The present invention also encompasses compositions, comprising particles of percarbonate according to the present invention, which further comprise particulate ingredients wherein a substantial portion of said particulate ingredients comprise a hydrophobic ester of citric acid or mixtures thereof. In the present invention, the hydrophobic esters of citric acid may be present in the particles of percarbonate only, or in some or all of the particulates present.

The compositions according to the present invention can be prepared with different bulk densities, from conventional granular products to so-called "concentrated" products (i.e. with a bulk density above 600 g/l).

The present invention further encompasses a method of manufacturing a particulate bleaching composition according to the present invention wherein said hydrophobic ester of citric acid or mixtures thereof is absorbed only onto said particles of percarbonate before their incorporation in said composition.

The present invention further encompasses a method of manufacturing a particulate bleaching composition according to the present invention wherein said hydrophobic ester of citric acid or mixtures thereof is absorbed, in the last process step of the manufacturing of said composition, i.e the finished composition, onto a substantial portion of said particles of percarbonate and said other particulate ingredients present in said composition.

By "absorbed" it is barely meant herein that the particles of percarbonate alone or together with other particulate ingredients further comprise a hydrophobic ester of citric acid or mixtures thereof. Said absorption may be obtained by different methods well known in the art such as spraying methods or coating or agglomerating methods.

Preferred herein is a method wherein said hydrophobic esters of citric acid, or mixtures thereof, are simply spray dried only onto said particles of percarbonate. Most preferred herein is to spray said hydrophobic esters of citric acid onto the finished bleaching compositions.

Accordingly, it is highly convenient to use said hydrophobic esters of citric acid which are liquid, so that said compounds can be sprayed onto the particles of percarbonate in liquid form. Many of the hydrophobic esters of citric acid described hereinabove fall into such a particular preferred category, e.g. acetyl triethyl citrate. Where the hydrophobic esters of citric acid have such a viscosity that could make it difficult to be sprayed onto the particles of percarbonate, said hydrophobic esters of citric acid can be premixed with other ingredients capable of decreasing their viscosity and thereby maximizing the spraying efficiency. Examples of such ingredients to dilute the hydrophobic esters of citric acid of the present invention are perfumes, olefines, surfactants and the like.

In another embodiment of the present invention said hydrophobic esters of citric acid may be used to coat or/and agglomerate only the particles of percarbonate or said particles together with other particulate ingredients present in the compositions.

The coating operation herein can be performed by any of the conventional coating techniques known in the art such as, for example, spraying particles in a pan-granulator or a rotating drum, followed by drying. In another method coating and drying can be effected in one step by using a fluid bed drier.

The agglomerating operation herein can be performed by any of the conventional agglomerating techniques known in the art.

In the embodiment of the present invention where the method consists on coating or/and agglomerating with hydrophobic esters of citric acid it may be necessary to adsorb said esters which are in a liquid form onto solid substrates such as porous silicates, polyacrylates, cellulose derivatives and even sulphates so as to obtain a solid matrix to coat or/and agglomerate the particles of percarbonate.

According to the present invention said hydrophobic ester of citric acid or mixtures thereof may be used as an agglomerating or/and a coating agent to agglomerate or/and coat the particles of percarbonate.

The particulate bleaching compositions described herein can be used as laundry detergent, bleach additive for laundry.

EXAMPLES

The following examples will illustrate the present invention. The following granular compositions are made by dry-mixing the listed ingredients in the listed proportions:

| Compositions | 1 | 2 |
|---|---|---|
| Sodium percarbonate | 45.0 | 46.0 |
| TAED | 10.0 | 10.0 |
| Silicate layered SKS[R]-6 | 17.0 | 0 |
| Citric acid | 4.0 | 7.0 |
| Lipase | 0.5 | 0.5 |
| Savinase | 0.5 | 0.5 |
| Sodium bicarbonate | 15.0 | 13.0 |
| Sokalan[R] CP5 granules | 3.0 | 4.0 |
| Brightener, perfumes | up to 100% | |

Compositions 1 and 2 were used as reference. Composition 1 contained silicate layered SKS[R]-6 and Sokalan[R] CP5 which are known in the art, as stabilizing agents. Composition 2 contained Sokalan[R] CP5. Similar compositions according to the present invention were prepared and sprayed with 3% of acetyl triethyl citrate by weight of the total composition, either on the finished composition or on sodium percarbonate only.

The self heating rates of the products were monitored as follows. The products were made and put in bottles. The bottles were then put in an oven which was heated up to 70° C. Probes in the products allowed to monitor the temperatures of the products. As soon as the products reached 70° C., the bottles were covered and the systems were isolated in an adiabatic/thermo bell which maintained the temperatures of the oven constant at 70° C. as above. This placed the products in adiabatic conditions and from thereon, the temperatures of the products were monitored. The temperature increases thus measured were due to the self-heating of the products (runaway reaction). The self heating occurs under a fast product decomposition and the rate is proportional to the extent of the decomposition. This test is representative of stressed conditions achievable during product making, shipment and storage. The table below lists the self heating rates (°C/h) obtained for compositions 1 and 2 with and without sprayed acetyl triethyl citrate.

| Compositions | 1 | 2 |
|---|---|---|
| Reference (without ATC) | 1.6 | 2.1 |
| Finished composition sprayed with 3% of ATC | 0.8 | 0.9 |
| Sodium percarbonate sprayed with 3% of ATC before its incorporation in the composition | — | 0.5 |

Comments:

Each result is an average of two self heating tests. The data clearly show the unexpected and strong stabilizing effect delivered by the spray addition of acetyl triethyl citrate both on the finished compositions and on the sodium percarbonate particles itself. This effect is clearly cumulative to the stabilization effect delivered by silicate SKS-6[R] and Sokalan[R] CP5.

Running the same experience by spraying the finished of composition 2 with 3% of acetyl caprolactam, which is a bleach activator well known in the art, results in a dramatically destabilization of the composition. The self heating rate obtained was of 20° C./h making the composition unfeasible from a manufacturing and storage point of view.

We claim:

1. A stable particulate bleaching composition comprising particles of alkali metal salt of percarbonate bleach or mixtures of said particles of percarbonate bleach, wherein said particles of percarbonate bleach are coated with and/or agglomerated with a stabilizing effective amount of a hydrophobic ester of citric acid or mixtures of said hydrophobic esters of citric acid.

2. A composition according to claim 1 wherein said alkali metal salt of percarbonate bleach is sodium percarbonate.

3. A composition according to claim 1 wherein said composition further comprises particulate ingredients selected from the group consisting of acidifying agents, inorganic filler salts, bleach activators, brighteners, soil release agents, soil suspenders, stabilizing agents, builders, chelants, surfactants, enzymes, dye transfer inhibitors, anti dust ingredients and perfumes.

4. A composition according to claim 3 wherein a substantial portion of said particulate ingredients are coated with and/or agglomerated with a hydrophobic ester of citric acid or mixtures of said hydrophobic esters of citric acid.

5. A composition according to claim 1 wherein said composition comprises from 10% to 100% by weight of the total composition of said coated and/or agglomerated particles of an alkali metal salt of percarbonate bleach or mixtures thereof.

6. A composition according to claim 5 wherein said composition comprises from about 10% to about 80% by weight of the total composition of said coated and/or agglomerated particles of an alkali metal salt of percarbonate bleach or mixtures thereof.

7. A composition according to claim 6 wherein said composition comprises from about 20% to about 60% by weight of the total composition of said coated and/or agglomerated particles of an alkali metal salt of percarbonate bleach or mixtures thereof.

8. A composition according to claim 1, characterized in that said composition comprises from 0.5% to 20% by weight of the total composition of said hydrophobic ester of citric acid or mixtures thereof.

9. A composition according to claim 8 wherein said composition comprises from about 1% to about 10% by weight of the total composition of said hydrophobic ester of citric acid or mixtures thereof.

10. A composition according to claim 9 wherein said composition comprises from about 3% to about 8% by weight of the total composition of said hydrophobic ester of citric acid or mixtures thereof.

11. A composition according to claim 1, characterized in that said hydrophobic ester of citric acid is an acylated citrate ester of the formula

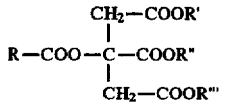

wherein R is selected from the group consisting of a $C_{1-9}$ alkyl or alkenyl group, a substituted or unsubstituted phenyl, alkylphenyl, or alkenylphenyl group and R', R" and R'" are selected from the group consisting of H, $C_{1-18}$ alkyl or alkenyl group, a substituted or unsubstituted phenyl, alkylphenyl or alkenyl phenyl group or mixtures thereof.

12. A composition according to claim 11, characterized in that said acylated citrate ester is an acylated triethyl citrate or mixtures thereof.

13. A composition according to claim 11 wherein said acylated triethyl citrate is selected from the group consisting of hexanoyl triethyl citrate, octanoyl triethyl citrate, nonanoyl triethyl citrate and acetyl triethyl citrate.

14. A method of manufacturing a stable particulate bleaching composition comprising particles of alkali metal salt of percarbonate bleach or mixtures of said particles of percarbonate bleach wherein said particles of percarbonate bleach are coated with and/or agglomerated with a stabilizing effective amount of a hydrophobic ester of citric acid or mixtures of said hydrophobic esters of citric acid, wherein said hydrophobic ester of citric acid is coated onto said particles of percarbonate bleach before their incorporation in said composition.

15. A method according to claim 14 wherein said hydrophobic ester of citric acid is sprayed onto said particles of percarbonate bleach and/or said particulate ingredients.

16. A method according to claim 14 wherein said hydrophobic ester of citric acid is coated on or agglomerated with, said particles of percarbonate bleach and said particulate ingredients.

17. A method of manufacturing a stable particulate bleaching composition comprising particles of alkali metal salt of percarbonate bleach or mixtures of said particles of percarbonate bleach, wherein said particles of percarbonate bleach are coated with and/or agglomerated with a stabilizing effective amount of hydrophobic ester of citric acid or mixtures of said hydrophobic esters of citric acid, wherein said hydrophobic ester of citric acid is coated, in the last process step, onto a substantial portion of said particles of percarbonate bleach and said particulate ingredients.

18. A method according to claim 17 wherein said hydrophobic ester of citric acid is sprayed onto said particles of percarbonate bleach and particulate ingredients.

19. A method according to claim 17 wherein said hydrophobic ester of citric acid is coated on and/or agglomerated with said particles of percarbonate bleach and said particulate ingredients.

* * * * *